G. N. Palmer,
Hay Spreader.
No. 51473
Patented Dec. 12, 1865.
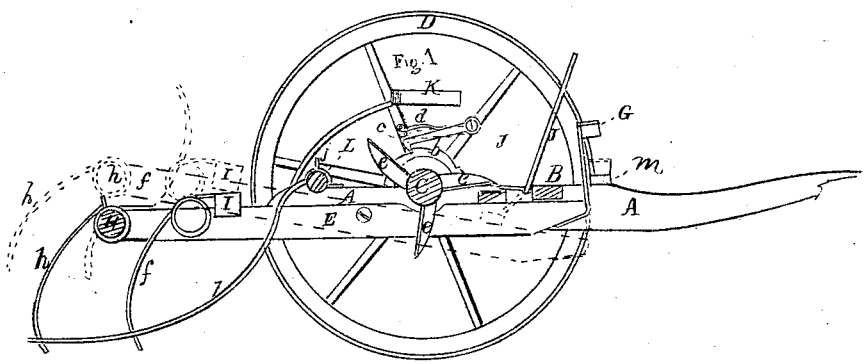
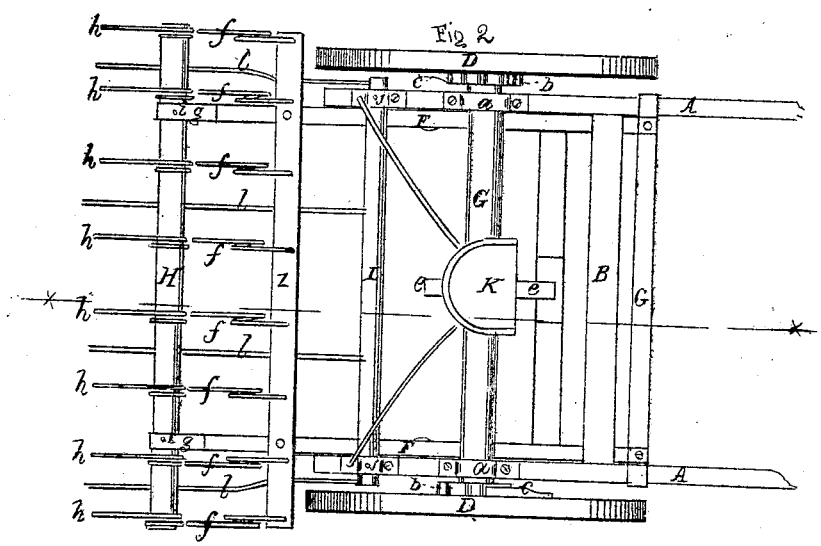
Witnesses
R. D. Smith
I. A. Heald
Inventor
George N. Palmer
By Attorney J. R. Woodruff

UNITED STATES PATENT OFFICE.

GEORGE N. PALMER, OF GREENE, NEW YORK.

IMPROVEMENT IN COMBINED HORSE-RAKE AND HAY-SPREADER.

Specification forming part of Letters Patent No. 51,473, dated December 12, 1865.

*To all whom it may concern:*

Be it known that I, GEORGE N. PALMER, of the town of Greene, in the county of Chenango, in the State of New York, have invented certain new and useful Improvements in a Combined Horse Hay Raking and Tedding Machine; and I do hereby declare the following is a full, clear, and exact description of the same, reference being had to the accompanying drawings, making a part of this specification, in which—

Figure 1 represents a side elevation of the machine, a section through at red line $x\ x$. Fig. 2 shows a plan or top view of same.

The object of my invention is to lighten manual labor, and to facilitate hay-making and gathering by the use of power, without multiplying the number of agricultural implements or adding materially to the cost of a first-class horse-rake.

My invention consists in the construction, arrangement, and combination of the parts by which the horse-rake may be used for spreading and turning over the hay with great facility, in the most perfect manner, performing what is known and called among farmers the "tedding" of hay, as well as raking up the hay into windrows for loading and putting up or carrying off the field or meadow.

To enable others skilled in the art to make and use my combined horse-rake and hay-tedding machine, I will describe it more fully, referring to the drawings and to the letters of reference marked thereon.

The shafts A A are secured together by a cross-bar, B, on which the whiffletree is placed for draft, the shafts A A being hung to a revolving axle-tree, C, by straps $a\ a$, which form the supports for the entire working mechanism. The wheels D D turn on the arms of the axle independent of each other, and when the machine is backed do not revolve the axle C, on each end of which are ratchet-wheels $b\ b$, and hook-pawls $c\ c$ on the wheels, held into the notches by springs $d\ d$ resting on them, so that in their forward movement the axle rotates with the wheels.

To the rear ends of the thills or shafts A A is hung the rake-frame F F, it being nearly balanced, the rear slightly preponderating, and made to vibrate up and down by the action of the cams or prongs $e\ e\ e$ on the center of the revolving axle C, by which means the rake-teeth $f\ f\ f\ f\ f$ take hold of the hay and draw it along until the cams $e\ e\ e$ raise the rake up, so that it will scatter or be left by the teeth $f\ f\ f$, when the back row of teeth $h\ h\ h\ h$, being regulated to a suitable height for the thickness of the hay on the ground by turning the rake-head H so that the teeth incline back, the rake-head H being secured to the rear ends of the frame F F by straps $g\ g$, and held in its position by thumb-screws or pins $i\ i$. The back row of teeth $h\ h\ h\ h$ will spread the hay evenly over the meadow for drying.

When the machine is used for raking up the hay into windrows, the teeth $h\ h\ h\ h$, on the back rake-head, H, are turned over forward and rest upon the top of the front rake-head, I, the hook-catches $c\ c$, on the wheels D D, are held out of the ratchets $b\ b$ by inserting pins into holes made in the wheels for that purpose, so that the rake-teeth $f\ f\ f\ f$ will continue to gather the hay and hold onto it until it is liberated and left in windrows by the action of the rock-shaft lever J, at the will of the driver as he sits in his seat, K. The keeper, or rake-teeth protector, I, has a round head with curved rods $l\ l\ l\ l$ inclined back, extending under the rake-teeth $f\ f\ f\ f$, and may be adjusted to the size of the windrow desired by set-screws or pins $j\ j$. This keeper helps to relieve the strain from the rake-teeth.

In order to have the rake resume its position as quickly as possible after it has been raised to pass over the windrow, I place india-rubber bumpers $m\ m$, to act as springs, to make the frame react on the top of the thills or shafts A A, so that the elevated cross-bar G in front of the driver will bear upon them and aid to effect the purpose.

It will readily be seen that by my mode of constructing a horse-rake and the arrangement of operating the two rakes a most efficient hay spreading or tedding machine is combined with the rake, thus making one machine answer the twofold purpose of making and gathering the hay.

As it has become almost impossible at this era for farmers and stock-growers to do their farming work and to secure their hay, as well as other crops, without using labor-saving implements, it is very desirable to not multiply their number more than can possibly be helped, as a large part of the year they are not required to be used, and must necessarily be housed to preserve them in a fit condition for future use, so that all that can possibly be done with one machine, or combined with it for various purposes, and perform the required functions of complete, independent implements, must, or should be, regarded as improvements which are practically necessary to meet the requirements of the masses of agriculturalists who have moderate-sized farms and limited means of operation. Therefore it will be seen that my invention as above described will be likely to be appreciated by a very large portion of agriculturists, as farming in this country is not likely to be carried on by very large monopolies.

Having thus described my invention, what I claim as new, and desire to secure by Letters Patent, is—

1. The construction and arrangement of the adjustable rear rake, H, in combination with the stationary rake-head I and vibrating frame F F, for spreading or tedding hay, operating as herein described, for the purposes set forth.

2. The spring bumpers $m\,m$, in combination with the balanced frame F F and the cams $e\,e\,e$ on the rotating axle C, for operating the tedding apparatus, substantially as and for the purposes specified.

In testimony whereof I hereunto subscribe my name.

GEO. N. PALMER.

Witnesses:
N. W. NORTHUP,
R. McDONALD.